United States Patent
Storm et al.

(10) Patent No.: US 10,349,477 B2
(45) Date of Patent: Jul. 9, 2019

(54) LED DOUBLE-CAPPED LAMP, FOR OPERATION ON AN ELECTRONIC BALLAST FOR A LOW-PRESSURE DISCHARGE LAMP, ESPECIALLY A FLUORESCENT LAMP, AND METHOD FOR OPERATING SUCH A LAMP

(71) Applicant: LEDVANCE GmbH, Garching bei Munchen (DE)

(72) Inventors: Arwed Storm, Dachau (DE); Xusheng Yang, Shenzhen Guangdong (CN); Andreas Mitze, Traunreut (DE); Peter Hummel, Munich (DE)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

(21) Appl. No.: 15/764,600

(22) PCT Filed: Sep. 30, 2016

(86) PCT No.: PCT/EP2016/073445
§ 371 (c)(1),
(2) Date: Mar. 29, 2018

(87) PCT Pub. No.: WO2017/055567
PCT Pub. Date: Apr. 6, 2017

(65) Prior Publication Data
US 2018/0279430 A1    Sep. 27, 2018

(30) Foreign Application Priority Data
Sep. 30, 2015   (DE) .................. 10 2015 218 836

(51) Int. Cl.
*H05B 33/08*    (2006.01)
*F21K 9/27*    (2016.01)
(Continued)

(52) U.S. Cl.
CPC .......... *H05B 33/0815* (2013.01); *F21K 9/27* (2016.08); *F21V 25/04* (2013.01);
(Continued)

(58) Field of Classification Search
CPC ............ H05B 33/0815; H05B 33/0818; H05B 33/0884; H05B 33/0809; H05B 33/0848; H05B 33/0857; H05B 33/0887
(Continued)

(56) References Cited

U.S. PATENT DOCUMENTS 9,277,603 B2 * 3/2016 Hsia .................. F21V 25/04
9,420,663 B1 * 8/2016 Hsia .................. H02M 1/32
(Continued)

FOREIGN PATENT DOCUMENTS

DE    102011100285 A1    11/2012
EP    2366948 A2 *    9/2011    ......... H05B 33/0803
(Continued)

*Primary Examiner* — Douglas W Owens
*Assistant Examiner* — Syed M Kaiser
(74) *Attorney, Agent, or Firm* — Hayes Soloway PC

(57) ABSTRACT

A double-capped LED lamp operates on an electronic ballast for a low-pressure discharge lamp. The lamp has a first lamp cap having at least one first lamp connection, a second lamp cap having at least one second lamp connection, and an LED driver unit, which is electrically coupled between the first lamp connection and the second lamp connection, for activating a plurality of LEDs on the basis of a lamp voltage supplied by the electronic ballast between the first lamp connection and the second lamp connection in a first operating state. The lamp comprises a switching element for the galvanic separation of the first lamp connection from the LED driver unit in a second operating state, and an activation device for switching at least from the second operating state into the first operating state according to the lamp voltage.

9 Claims, 3 Drawing Sheets

(51) Int. Cl.
*F21V 25/04* (2006.01)
*F21Y 115/10* (2016.01)
(52) U.S. Cl.
CPC ..... *H05B 33/0809* (2013.01); *H05B 33/0842* (2013.01); *F21Y 2115/10* (2016.08); *H05B 33/0884* (2013.01); *Y02B 20/383* (2013.01); *Y02B 20/386* (2013.01)
(58) Field of Classification Search
USPC ............. 315/291, 294, 224, 307, 200 R, 198
See application file for complete search history.

(56) References Cited

U.S. PATENT DOCUMENTS

| | | |
|---|---|---|
| 2010/0033095 A1 | 2/2010 | Sadwick |
| 2015/0061542 A1 | 3/2015 | Hsia et al. |

FOREIGN PATENT DOCUMENTS

| | | | | |
|---|---|---|---|---|
| EP | 2477456 A1 | 7/2012 | | |
| WO | 2013150417 A1 | 10/2013 | | |
| WO | WO 2013150417 A1 | * 10/2013 | ......... | H05B 33/0806 |

* cited by examiner

LED DOUBLE-CAPPED LAMP, FOR OPERATION ON AN ELECTRONIC BALLAST FOR A LOW-PRESSURE DISCHARGE LAMP, ESPECIALLY A FLUORESCENT LAMP, AND METHOD FOR OPERATING SUCH A LAMP

FIELD

The invention relates to a double-end LED lamp for operation at an electronic ballast unit for a low-pressure discharge lamp, particularly a fluorescent lamp, according to the preamble of claim 1. In addition, the invention relates to a method of operating a double-end LED lamp at an electronic ballast unit for a low-pressure discharge lamp according to the preamble of claim 10.

BACKGROUND

Light sources based on light-emitting diodes (LEDs) have matured within a few years to become a competitive alternative to traditional light sources, such as incandescent lamps, halogen lamps or (compact) fluorescent lamps, for example. LED technology has advanced to provide a greater efficiency than fluorescent lamps. Consequently, LED lighting solutions have increasingly gained entry into areas in which fluorescent lamps previously dominated. Many fluorescent lamp applications are concentrated in the professional field (office), because light control installations incorporated in an automated building system (e.g. LON, EIB) are often in use here.

Installations of that kind are projected on a predetermined period of use, as a result of which conversion to energy-saving LED lighting technology results in a substantial outlay for re-equipment. Consequently, LED lamps are constructed as a direct replacement for fluorescent lamps to retrofit the existing fittings. These so-called retrofit lamps are available on the market as double-end LED lamps with the respective standard G13 socket (T8 lamps with 26 mm tube diameter) or G5 socket (T5 lamps with 16 mm tube diameter).

When defective fluorescent lamps are replaced, particularly in the case of double-end fluorescent lamps, it is usual practice to replace the lamp without previously switching the fitting to be free of voltage. Moreover, there is even a method to identify a light in an existing light fitting relative to a control device in that the corresponding light source is rotated out of the mount during operation, so-called 'relamping.' Electronic ballast units for low-pressure discharge lamps, particularly fluorescent lamps, are constructed in such a way that for the case of a lamp inserted only at one end in a socket supplied with voltage the possibility of an electric shock for anyone holding the lamp is excluded. In that case, fluorescent lamps may include a gas content of the interior of the tube that is highly resistive in a non-ignited state, i.e. insulating. As a consequence, an exposed end of a fluorescent lamp can be held without concern while the other end has a voltage potential.

This inherent protective characteristic is not present at the outset in the case of LED lamps. However, safety standard IEC 62776 requires that double-end lamps not have a voltage at the opposite end at the time of mounting the lamp with a socket fitted at one end to avoid risk of an electric shock. In this connection, DE 10 2011 100 285 A1 discloses devices for safety connection against electric shock and destruction for double-end light sources such as LED tubes and fluorescent tubes. To avoid electrical intrusion into the light, a respective pushbutton as a closer is installed in the two end caps of the tube. The positioning of the button between the contacts to suit all socket types is critical. The button closes when fitting the contact to the electrical terminals, and an open current-conducting end is effectively prevented. Through installation of contacts in the LED tube, a current flow is possible only when the tube is correctly inserted and locked.

SUMMARY

It is an object of the present invention to provide an LED lamp and a method of operating an LED lamp, which offers more reliable protection from an electric shock.

This object is fulfilled by an LED lamp with the features of claim 1 and by a method with the features of claim 10. Advantageous developments of the present invention are the subject of the dependent claims.

The invention proceeds from a double-end LED lamp for operation at an electronic ballast unit for a low-pressure discharge lamp, particularly a fluorescent lamp, comprising a first lamp socket with at least one first lamp terminal, a second lamp socket with at least one second lamp terminal and an LED driver unit, which is electrically coupled between the first lamp terminal and the second lamp terminal for drive control of a plurality of LEDs from a lamp voltage, which can be provided between the first lamp terminal and the second lamp terminal by the electronic ballast unit, in a first operating state. Depending on the respective instantaneous operating state of the electronic ballast unit the lamp voltage is also termed pre-heating voltage, ignition voltage, or operating voltage. The first lamp socket and the second lamp socket each may include a lamp socket of the type G13 or G5. The LED driver unit preferably comprises at least one rectifier unit for providing a direct voltage to the plurality of LEDs from the lamp voltage, which can be provided by the electronic ballast unit and which may be composed of a direct voltage component and an alternating voltage component. According to the invention the LED lamp may be enhanced by a switching element for electrical isolation of the first lamp terminal from the LED driver unit in a second operating state and a drive control device for change at least from the second operating state to the first operating state based on the lamp voltage.

The invention is based on recognizing that a particularly reliable electrical separation of the lamp path from the first lamp terminal to the second lamp terminal can be achieved in that a switching element is activated not in dependence on an installed position of the LED lamp, but in dependence on an operating state of the LED lamp. Moreover, such a drive control of the switching element opens up a number of possibilities of increasing the intrinsic safety of the LED lamp and achieving operating behaviour, which simulates the behavior of a low-pressure discharge lamp, with respect to possibilities of fault. Thus, a largest possible compatibility with electronic ballast units for low-pressure discharge lamps, particularly fluorescent lamps, can be achieved. The automatic activation of the switching element, for example in the form of a relay, thus simulates the characteristic of a low-pressure discharge lamp, which means a high degree of impedance prior to ignition and a rated impedance in operation as well as, in the further course, a high impedance in the case of fault.

In an advantageous development the LED lamp comprises a supply device designed for providing a supply voltage for the switching element from the lamp voltage independently of the LED driver unit. It is thereby possible to exclude that, as a consequence of a defect of the LED driver unit, a correct activation of the switching element in correspondence with the predetermined operating behavior is no longer ensured, because, for example, a consequential fault of the defective LED driver unit has caused damage to the drive control device for the switching element. In particular, the capability of electrical isolation of the switching element will remain guaranteed in the case of failure of the LED driver unit with a short-circuit, which in principle cannot occur in the case of a low-pressure discharge lamp. This is ensured by the arrangement of the supply device independently from the LED driver unit.

The supply device may comprise a coupling device to enable electrical isolation between the first lamp terminal and the second lamp terminal. As a result, a supply voltage for the switching element can be produced from the lamp voltage without having to eliminate the electrical separation of the first lamp terminal and the second lamp terminal in the second operating state when the switching element is electrically isolated. In this way, the supply device can never itself be the cause of an electrical connection between the first lamp terminal and the second lamp terminal, from which risk to a person could arise even though the switching element executes the electrical isolation to specification.

It may be particularly advantageous if the coupling device comprises at least one first coupling capacitor coupled with the first lamp terminal, wherein the first coupling capacitor is formed by a series circuit of a first series capacitor with a first capacitance and a first voltage load capability and a second series capacitor with a second capacitance greater than the first capacitance and a second voltage load capability smaller than the first voltage load capability. The second series capacitor of the series circuit forming the coupling capacitor may have a higher capacitance and the lower voltage load capability. This is advantageously constructed in such a way that it fulfils a Y2 specification in accordance with the Standard IEC 60384-1, which is required for capacitors which bridge over a basic isolation of a device operated by mains voltage, and in particular in a multiple voltage range between 150 volts AC and 300 volts AC. Class Y capacitors according to IEC 60384-1 are capacitors which are connected between phase or neutral conductor and contactable protectively earthed device housings and thus bridge over the basic isolation. According to this standard, Y capacitors are permitted to be only those capacitors which in the case of limited capacitance have checkable increased electrical and mechanical reliability, since in their use it is possible for a risk to persons or animals by electric shock to arise in the event of failure due to short-circuit.

Maintenance of the electrical isolation via the LED lamp is thus ensured by the second capacitor in the illustrated form of embodiment. By contrast thereto, the first series capacitor has a low capacitance and accordingly has to be designed for higher voltages. In particular, the first series capacitor for the ignition voltages usually produced by electronic ballast units have to be dimensioned in the order or magnitude of 700 volts RMS. On the other hand, a Y2 design is not required for the first series capacitor.

In an embodiment, the supply device comprises a voltage regulator, particularly a parallel voltage regulator. The voltage regulator can be constructed as a linear regulator or as a two-position regulator. The arrangement in a parallel regulator topology as a shunt regulator may have the advantage that the regulator can be subject to high-impedance switching below a predeterminable threshold of the supply voltage. A disruptive influence on voltage formation of the supply voltage in a range of the supply voltage may be significantly reduced in comparison with its regulating target value is thus excluded.

It may be provided that the coupling device of the supply device is designed for a two-stage supply. In that regard, the coupling device may comprise a second coupling capacitor coupled with a terminal, which is electrically connected with the switching element of the LED driver unit. The first coupling capacitor may supply the supply device with a capacitive current, which is produced by way of the alternating voltage of the electronic ballast unit when the switching element is in the electrically isolated state, wherein the first coupling capacitor $C$ is so dimensioned that, particularly in the case of an ignition frequency of the alternating voltage of the electronic ballast unit with an ignition voltage amplitude, a sufficiently high level of current can be coupled into the supply device so as to thereby provide the activation power for the switching element. After switching-on of the switching element, the electrical isolation is bridged over and the voltage between the two lamp terminals drops to the intended operating voltage, which is significantly lower than the ignition voltage. To avoid a supply bottleneck by the first coupling capacitor, it is proposed to couple a second coupling capacitor behind the switching element, where the second coupling capacitor has a greater capacitance than the first coupling capacitor, but for that purpose needs a lower voltage load capability, since it no longer sees an ignition voltage. In this way, a particularly efficient coupling-out of energy from the lamp voltage can be achieved without drawing off an unnecessarily high level of current from the lamp circuit in one of the two operating modes. In a normal operating mode of the LED lamp, a self-locking of the switching element can take place substantially by way of power supply via the second coupling capacitor.

According to a particularly preferred form of embodiment, the supply device and/or the drive control device may be designed for the purpose of producing the electrical isolation of the switching element when the lamp voltage drops below a predeterminable minimum value. This can be the case, for example, in the event of a low operating voltage at the electronic ballast unit, due to a short-circuit in the LED driver unit (switch-mode driver) for example, a conductor path short-circuit, or a failure of other components. Equally, a too-low operating voltage can also be present, for example, due to faulty programming of an electronic ballast unit controlled by way of a program-controlled computer unit (microcontroller).

The supply device and/or the drive control device can be designed for the purpose of producing the electrical isolation of the switching element when the lamp voltage exceeds a predeterminable maximum value. A too-high operating voltage at the electronic ballast unit can arise, for example, in the case of failure of the switch-mode driver of the LED driver unit, a conductor track breakage, a breakage of soldered contacts, or another failure of components. By means of the electrical isolation of the switching element in a fault state of that kind, thus the controlling of the switching element to the second operating state, fault cases of the LED driver unit, for which the electronic ballast unit is not prepared due to its original orientation towards operation for low-pressure discharge lamps, can be reproduced for known fault cases, namely a high-impedance lamp. In this way, unknown fault states can be attributed to known fault states. After extinguishing the gas discharge in a low-pressure discharge lamp, the lamp path is high impedance; the same behavior is now also provided by the fault emulation illustrated in the foregoing. The electronic ballast unit can react thereto as intended, for example in that it places itself in a shutdown mode in this state. The electronic ballast unit can remain in this shutdown mode until so-called relamping has taken place, i.e. the filament or filament substitute resistances were removed from the corresponding start paths of the electronic ballast unit and reinserted.

It can be provided that the supply device and/or the drive control device may be designed for ending the electrical isolation of the switching element only when the lamp voltage has in the interim dropped below a predetermined reset value. In this way it is possible to realise a self-locking which has the effect that after a fault, the switching element remains isolated, i.e. the second operating state is maintained, until the voltage between the first lamp terminal and the second lamp terminal is present again, even if with appropriately reduced amplitude. In this way it is possible to avoid unstable states, particularly avoiding permanent switching-on and switching-off of the switching element. Action of the drive control on the switching element can take place not only through the supply device, but also through the drive control device, equally by a combination of the two. There is the result that in the case of failure of the lamp voltage the supply device is also no longer in a position of providing sufficient voltage for drive control of the switching element, so that this—in correspondence with the embodiment according to the invention of an electrically isolated state without a lamp voltage present between the first lamp terminal and the second lamp terminal—is thus constrainedly controlled into the electrically isolated state. Thus, embodiments can also be provided in which functional separation of the components into the supply device and drive control device is not possible. For that purpose, reference is made to the preferred embodiments as depicted in the further illustrations.

In an embodiment, the switching element is formed by at least one electromechanical switching relay with at least one switching contact, wherein several switching contacts are connected in series. This serves for maintenance of the required air and leakage paths, which cannot be realised within a switching contact by the relays in the size predetermined by the geometry of the LED lamp. Thus, it can be provided that several switching contacts are combined in one switching element and are controlled in drive by a common excitation coil. Equally, it can be provided that there are two individual components which each have an individual activation coil and are activated in parallel or series by way of the supply device and/or the drive control device. As already illustrated in the case of the design of the first coupling capacitor, the requirement of basic isolation must be fulfilled for provision of the electrical separation between the first lamp terminal and the second lamp terminal. Accordingly, in the case of a construction meeting the standard a minimum spacing of 2.5 millimeters is to be maintained on an exposed circuitboard, but within a relay present in an encapsulated chamber without risk of contamination a reduction of the spacing to 1.6 millimeters is possible. However, with the available relays even the shortened spacing cannot be maintained without further measures, for which several relay contacts are connected in series. As a result, it can also be ensured that the switching element, thus the electromechanical switching relay, cannot be arced over during the ignition phase. This is particularly important when an electronic ballast unit is constructed in such a way that it initially reacts to the fault case of an extinguished gas discharge with a new attempt at ignition. In this instance, an LED lamp with a fault self-locking would leave the switching relay in the open state, as a result of which the ignition voltage would be present over the entire ignition phase across the contacts of the electromechanical switching relay.

The invention additionally proceeds from a method for operating a double-end LED lamp at an electronic ballast unit for a low-pressure discharge lamp with a first lamp socket with at least one first lamp terminal, a second lamp socket with at least one second lamp terminal and an LED driver unit electrically coupled between the first lamp terminal and the second lamp terminal. The method comprises drive control of a plurality of LEDs from a lamp voltage, which can be provided between the first lamp terminal and the second lamp terminal by the electronic ballast unit, in a first operating state. According to the invention, the method is developed by electrical isolation of the first lamp terminal from the LED driver unit in a second operating state and change at least from the second operating state to the first operating state in dependence on the lamp voltage.

The method can change from the second operating state to the first operating state takes place during an ignition process of the ballast unit. In addition, it can also be provided that a change from the second operating state to the first operating state may take place during a preheating phase of the ballast unit. A transition from the second operating state to the first operating state takes place in an interval between the start of the preheating phase and the end of the ignition phase. Alternatively, it can also be provided that a change from the second operating state to the first operating state takes place exclusively within the ignition phase. In other words, the change from the second operating state to the first operating state is here dependent on an amplitude of the lamp voltage.

In an embodiment, the method comprises determining the lamp voltage in the first operating state, changing to the second operating state at least in one of the two cases when the lamp voltage in a first case drops below a predeterminable minimum value or in a second case exceeds a predeterminable maximum value, and preventing fresh change to the first operating state until the lamp voltage has dropped below a predeterminable reset value. In that case, the reset value is selected to be lower than the minimum value, substantially lower than the minimum value. Thus, in a fault case of the LED driver unit, for example when there is a short-circuit or a partial shedding of load in the LED driver unit, the electrical isolation of the connection between the first lamp terminal and the second lamp terminal can be left and a fault state with isolated switching element can thus be kept until the electronic ballast unit switches off.

In that regard, the coupling device is preferably dimensioned that the contact currents required in IEC 62776, section 13, are not exceeded.

The advantages and features as well as forms of embodiment described for the LED lamp according to the invention apply equally to the method according to the invention and conversely. Consequently, method features appropriate to device features and conversely can be provided.

BRIEF DESCRIPTION OF THE DRAWINGS

The features and feature combinations mentioned beforehand in the description and the features and feature combinations mentioned in the following in the figure description and/or shown solely in the figures are usable not only in the respectively indicated combination, but also in other combinations or by themselves without departing from the scope of the invention. Thus, embodiments which are not explicitly shown or explained in the figures but are inferred and can be produced by separate feature combinations from the explained embodiments, are also to be regarded as embraced by the invention and disclosed.

Further advantages and features are evident by way of the preceding description of embodiments with consideration of the accompanying figures. The same reference numerals denote the same features and functions in the figures.

DETAILED DESCRIPTION

IEC 62776, section 13, requires electrical isolation of the contact pins at the two ends of an LED retrofit lamp with a G13 socket or G5 socket (LED replacement for rod-like low-pressure discharge lamps) with maintenance of air and leakage paths.

Adherence to IEC 62776, section 13, is usually solved by means of mechanical switches in the socket or by relays.

The invention proposes a drive control circuit by which the relays are closed when an HF voltage ("high frequency voltage"; approximately 50 to 100 kHz) at the lamp pins is detected. The HF voltage corresponds with the so-called ignition burst at the output of the electronic ballast unit (EBU). Moreover, a monitoring circuit constrains the relay to open in the case of a fault (e.g., short circuit or partial shedding of load in the LED driver). The fault state with opened relay is kept until the electronic ballast unit switches off. The detection circuit is such that the contact currents required in IEC 62776, section 13, are not exceeded.

In this arrangement, the operating behavior with fault modes of a low-pressure discharge lamp is simulated and thus a greatest possible degree of compatibility with electronic ballast units on the market achieved. The following detailed illustration shows the detection of high frequency, the relay activation regulated by a two-position regulator, and fault switching-off with fault memory in the case of impermissible operating voltages.

Fault cases, which are detected by a window comparator, in the LED driver lead to locked opening of the relay contact. Open relay contacts correspond with shedding of load at the electronic ballast unit. The electronic ballast unit switches off in controlled manner when load is shed (normative requirement of electronic ballast unit). The relay drive control thus simulates the characteristic of a low-pressure discharge lamp, namely a high impedance prior to ignition, the rated impedance in operation and a high impedance in the case of fault. The self-locking in the fault case is eliminated by means of the thyristor simulation as soon as the electronic ballast unit switches off, namely when the output current drops below a limit value.

The window comparator may be replaced by maximum voltage recognition at one side. As a consequence, inherent switching off may follow in the case of short-circuit in the driver by dropping below the holding voltage at the relay, in addition realisation of the two-position regulator by a coupled operational amplifier (OpAmp), realisation of the window comparator by a coupled OpAmp, increase in the air and leakage paths in the relay contacts by series connection of several contacts in several relays, wherein the relay coils can be operated in serial or parallel connection.

Figure 1:
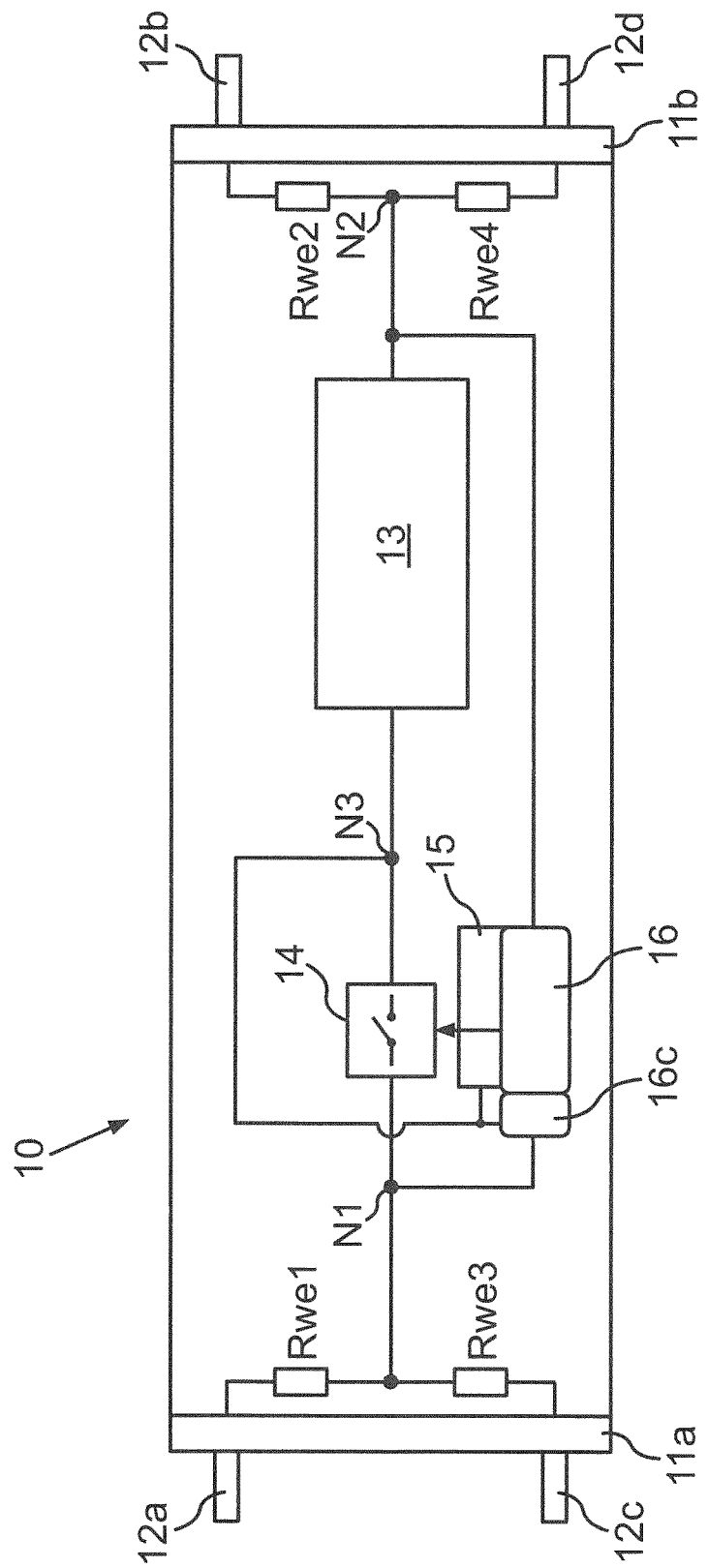
FIG. 1 shows, in simplified schematic illustration, a preferred embodiment of an LED lamp according to the invention.

A preferred embodiment of an LED lamp 10 according to the invention is illustrated in FIG. 1. The LED lamp 10 has a tubular construction and is double-ended with a first lamp socket 11a and a second lamp socket 11b. In that case, the first lamp socket 11a comprises a first terminal pin 12a and a third terminal pin 12c. The second lamp socket 11b comprises a second terminal pin 12b and a fourth terminal pin 12d. In the case of a low-pressure discharge lamp, a respective lamp filament would be arranged between the first connecting pin 12a and the third connecting pin 12c or between the second connecting pin 12b and the fourth connecting pin 12d, the lamp filament providing a current path across the respective pin pair 12a, 12c or 12b, 12d. Such a current path is usually monitored by the electronic ballast units for low-pressure discharge lamps at least on one side to detect the presence of a lamp and thus initiate a start process of the lamp only when the appropriate current path has been detected.

In order to provide this current path in the case of the lamp 10, a suitable network is provided which is realised by two filament_substitute resistances Rwe1 and Rwe3 serially coupled between the first connecting pin 12a and the third connecting pin 12c. Equally, a filament substitute resistance Rwe2 and a filament substitute resistance Rwe4 are coupled in serial arrangement between the second connecting pin 12b and the fourth connecting pin 12d. The four filament substitute resistances Rwe1, Rwe2, Rwe3 and Rwe4 can be dimensioned to be of the same size.

A first junction N1 is given by the connection between the first filament substitute resistance Rwe1 and the third filament substitute resistance Rwe3. In the same way, a second junction N2 is given by the connection between the second filament substitute resistance Rwe2 and the fourth filament substitute resistance Rwe4.

An LED driver unit 13 (LED driver) and an electromechanical switching relay 14 are electrically coupled between the first junction N1 and the second junction N2, wherein an electrical connection of the LED driver unit 13 with the electromechanical switching element 14 is given by a third junction N3. The electromechanical switching relay 14 is arranged in series with the LED driver unit 13.

The first connecting pin 12a or the third connecting pin 12c can serve as first lamp terminal and the second connecting pin 12b or fourth connecting pin 12d can be considered as second lamp terminal. In the illustrated embodiment, reference is made for the sake of simplicity to the first junction N1 as first lamp terminal and to the second junction N2 for the second lamp terminal, which appears advantageous having regard to the usually required dimensioning of the filament substitute resistances Rwe1, Rwe2, Rwe3 and Rwe4.

The LED lamp 10 further comprises a drive control device 15 for drive control of the switching relay 14. A supply device 16 serves to provide a supply voltage for the switching relay 14 and for the drive control device 15 and is coupled with the second junction N2. The supply device 16 comprises a coupling device 16c, which is electrically coupled not only with the first junction N1, but also with the third junction N3. By way of this the drive control device 15 is also coupled with the third junction N3.

Figure 2:
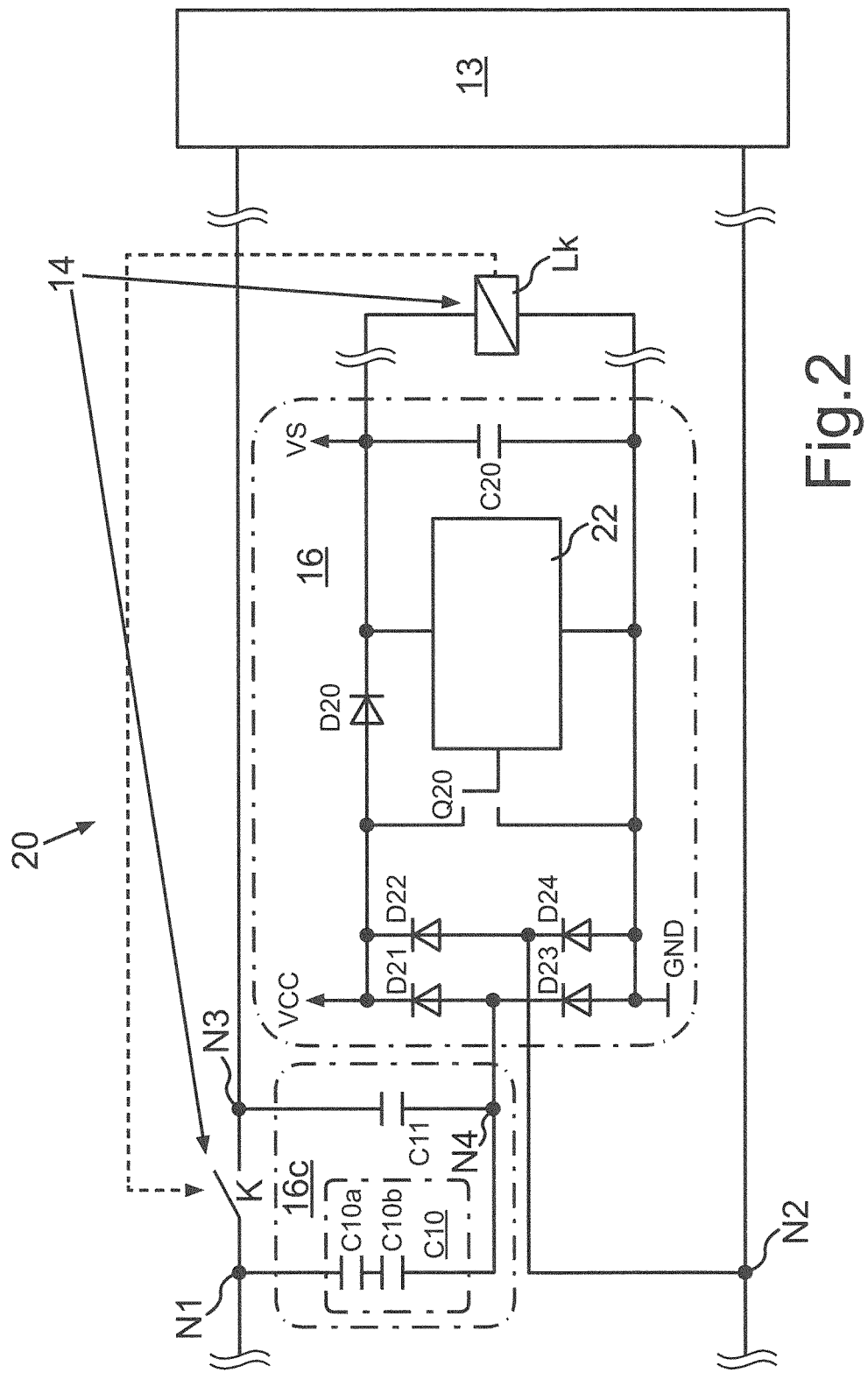
FIG. 2 shows, in simplified schematic illustration, a part of a preferred embodiment of an LED lamp according to the invention with a switching element and a supply device, in concrete form.

A first circuit part 20 of the LED lamp 10 according to the illustration of FIG. 2 shows a preferred concrete embodiment of a supply device 16 with a coupling device 16c. The switching element in the form of the switching relay 14 is in that case illustrated separated out as relay contact K. The relay contact K is in that regard arranged between the first junction N1 and the third junction N3, which are arranged electrically isolated from one another, wherein the relay contact K produces an electrically conductive connection between the first junction N1 and the third junction N3 when the relay coil Lk is activated by a control voltage Vs exceeding a predetermined response voltage. The supply device 16 comprises a bridge rectifier formed by four diodes, namely a first rectifier diode D21, a second rectifier diode D22, a third rectifier diode D23 and a fourth rectifier diode D24. The cathodes of the first rectifier diode D21 and the second rectifier diode D22 are in that case connected together and form a junction Vcc. The anodes of the third rectifier diode D23 and the fourth rectifier diode D24 are electrically connected and form a junction GND used as reference potential. The anode of the second rectifier diode D22 is electrically connected with the cathode of the fourth rectifier diode 24 and additionally coupled with the second junction N2. The coupling device 16c comprises a first coupling capacitor C10 and a second coupling capacitor C11, wherein the first coupling capacitor C10 is preferably formed as a series circuit of a first series capacitor C10a and a second series capacitor C10b. A fourth junction N4 is given by an electrical connection of the anode of the first rectifier diode D21 and the cathode of the third rectifier diode D23. The first coupling capacitor C10 is preferably coupled between the first junction N1 and the fourth junction N4. Equally, the second coupling capacitor C11 is preferably coupled between the third junction N3 and the fourth junction N4.

A transistor Q20 can preferably be coupled between the junction Vcc and the junction GND, wherein a reference electrode of the transistor Q20 is in electrical contact with the junction GND and a working electrode of the transistor Q20 is in electrical contact with the junction Vcc. A decoupling diode D20 is coupled between the junction Vcc and the junction Vs, the anode of the decoupling diode D20 being arranged on the side of the junction Vcc and the cathode of the decoupling diode D20 on the side of the junction Vs. In addition, a capacitor C20 is coupled between the junction Vs and the junction GND. Moreover, the relay coil Lk is coupled between the junction Vs and the junction GND. Equally, a two-position regulator 22 is coupled between the junction Vs and the junction GND and provides drive control of the transistor Q20 at the control electrode thereof. For preference, the transistor Q20 can be a MOSFET.

The second coupling capacitor C10b preferably has a higher capacitance than the first coupling capacitor C10a. The second coupling capacitor C10b is constructed as a capacitor designed in accordance with the category Y2 according IEC 60384-1.

The mode of functioning is illustrated in the following by way of the example of a start process of an electronic ballast unit connectible between the first lamp terminal with the first terminal pin 12a and the third terminal pin 12c and the second lamp terminal with the second terminal pin 12b and the fourth terminal pin. For the sake of simplification, it is assumed in that regard that the lamp voltage provided by the electronic ballast unit lies between the first junction N1 and the second junction N2. In a first operating phase of the electronic ballast unit this can now execute a preheating cycle with a first lamp voltage, wherein in this state an open switching relay 14 is assumed. Starting from the junction N1, current is coupled out by means of the first coupling capacitor C10 and is provided by way of the bridge rectifier, which consists of the four rectifier diodes D21, D22, D23 and D24, for producing a supply voltage between the junction Vcc and the junction GND. In that case, the capacitor C20 can also be charged by way of the decoupling diode D20, wherein the voltage between the junction Vs and the junction GND is then present at the relay coil Lk. The first coupling capacitor C10 can now be dimensioned in such a way that the generated voltage between the junction Vs and the junction GND is not sufficient to control the switching relay 14 into the closed state, which is the second operating state. Rather, it remains in the first operating state in which the relay contact K remains in the opened state and thus the electrical separation between the first junction N1 and the third junction N3 (and thus also the second junction N2) is maintained. After expiry of a predeterminable preheating time, the electronic ballast unit may usually change to ignition operation, in which the voltage applied between the first junction N1 and the second junction N2 is now significantly increased by comparison with the voltage applied in the preheating operation. Due to the now substantially higher ignition voltage between the first junction N1 and the second junction N2, the current supplied by the first coupling capacitor C10 is now so high that the voltage able to be provided between the junction Vs and the junction GND is of such a magnitude that the relay coil Lk can close the relay contact K.

The voltage between the junction Vs and the junction GND can be of such a magnitude that the two-position regulator 22 from a predeterminable voltage threshold switches in the transistor Q20 between the junction Vs and the junction GND to oppose a further voltage rise between the junction Vs and the junction GND. In this way, the current supplied by way of the first coupling capacitor C10 is directly short-circuited behind the rectifier. This form of voltage limitation represents only one of several suitable circuit variants; in the simplest case, the transistor Q20 can also be replaced by a voltage-limiting Zener diode.

After the relay coil Lk has caused the relay contact K to close, the first junction N1 is now electrically conductively connected with the third junction N3. A parallel connection of the first coupling capacitor C10 and the second coupling capacitor C11 thus now arises, which now conjunctively feed the rectifier having the rectifier diodes D21, D22, D23, D24. The electronic ballast unit for its part will now register a 'through-ignition' of the LED lamp 10 and consequently change to a normal operating mode in which the lamp voltage is now significantly further reduced by comparison with the ignition voltage. In that case, the reduction of the ignition voltage can already take place by itself without the assistance of the electronic ballast unit in that now present at an output circuit of the electronic ballast unit is a load impedance which, for example, damps an oscillatory circuit usually used in electronic ballast units. In that regard, the parallel circuit consisting of the first coupling capacitor C10 and second coupling capacitor C11 is so dimensioned that with a lamp voltage (operating voltage) present in steady operation of the LED driver unit 13, a voltage supply of the relay coil Lk between the junction Vs and the junction GND with a sufficient voltage reserve results. It can be provided that the two-position regulator 22 does not intervene in the steady operation, i.e. the voltage between the junction Vs and the junction GND lies within the permitted range.

If the electronic ballast unit (EDU) is switched off, the voltage between the junction Vs and the junction GND may drop because no further current is subsequently supplied by way of the junction Vcc, which ultimately leads to dropping out of the relay contact K when the voltage at the relay coil Lk falls below a predetermined holding voltage. The electrical separation between the first junction N1 and the third junction N3 is thereby reinstated.

As can be recognised from the preceding illustration, the described form of embodiment of the supply device 16 takes over, at least partly, functions of the drive control device 15 in that, for example, in the case of decay of the lamp voltage (operating voltage) a transition from the first operating state to the second operating state occurs, in which opening of the relay contact K takes place automatically. Equally, through the supply device 16 an automatic switching-on of the relay contact K can be initially undertaken in the case of a sufficient supply situation, whereby a change from the second operating state to the first operating state arises automatically.

Figure 3:
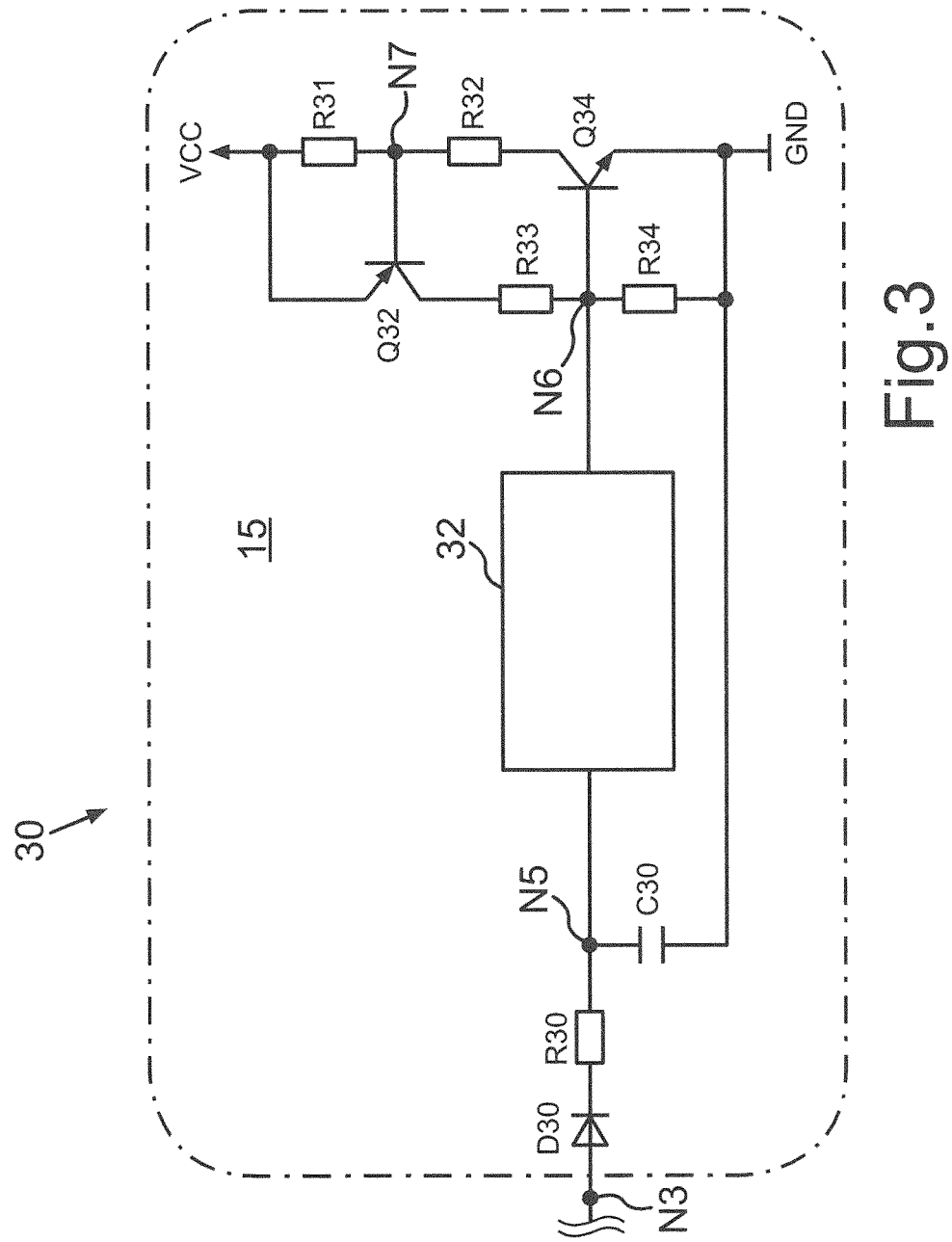
FIG. 3 shows, in simplified schematic illustration, a preferred embodiment of a drive control device according to the invention, in concrete form.

A second circuit part 20 is now illustrated in FIG. 3, which in supplement to the first circuit part 20 in FIG. 2 represents a concrete form of a drive control device 15, wherein further drive control functions are integrated. The second circuit part 30 comprises a diode D30 and a resistance R30 connected in series therewith, these being coupled between the third junction N3 and a fifth junction N5. A capacitor C30 is coupled between the fifth junction N5 and the junction GND. A window comparator 32 is coupled between the junction N5 and a further junction N6.

The second circuit part 30 additionally comprises a self-locking stage consisting of four resistances R31, R32, R33, R34 as well as a second transistor Q32 and a third transistor Q34. The second transistor Q32 is in that case constructed as a PNP transistor and the third transistor Q34 is constructed as an NPN transistor. The resistance R31 is coupled between the junction Vcc and a seventh junction N7. The base-emitter path of the second transistor Q32 is coupled parallel thereto. Coupled between the sixth junction N6 and the junction GND is the resistance R34 and coupled parallel thereto is the base-emitter path of the third transistor Q34. The resistance R33 is coupled between the collector of the second transistor Q32 and the junction N6 and the resistance R32 is coupled between the collector of the third transistor Q34 and the junction N7. A thyristor is simulated by a circuit arrangement of that kind, wherein after supply of a basic current for the third transistor Q34 at the junction N6 a basic current is maintained in alternation respectively for the second transistor Q32 and the third transistor Q34, so that the second transistor Q32 and the third transistor Q34 remain in a conductive state even when a basic current is no longer supplied to the junction N6 by the window comparator 32.

Ascertaining the lamp voltage takes place by way of coupling to the third junction N3 by means of the diode D30 and the resistance R30, which charge the capacitor C30, which is arranged at an input of the window comparator 32, namely at the fifth junction N5. The window comparator 32 can be designed so that the peak value, which is coupled by way of the one-way rectifier, of the rectified lamp voltage is evaluated in that there is comparison with a minimum value and/or a predeterminable maximum value and in the case of falling below the predeterminable minimum value or in the case of exceeding the predeterminable maximum value the basic current required for through-control of the thyristor simulation is supplied to the junction N6. The resistances R31, R32, R33, R34 are in that regard advantageously so dimensioned in that in the case of a usually present lamp voltage the current coupled in by way of the coupling device 16c after rectification by way of the bridge rectifier D21 to D24 produces at the thyristor simulation a voltage drop Vcc lying below the response voltage of the relay coil Lk. In this way, permanent switching-off of the switching contact K can be maintained in particularly simple and reliable manner as long the lamp voltage still remains above a predeterminable minimum value and has not dropped below this. The predeterminable minimum value of this voltage can in that case take place by setting the resistances R31, R32, R33, R34 in dependence on the amplification factors of the second transistor Q32 and the third transistor Q34. The coupling-in of the lamp voltage by way of the third junction N3 by means of the diode D30 and the resistance R30 will neither initiate a new electrically coupled path nor produce a fixed potential reference with the LED driver unit 13. Rather, the second circuit part 20 and the third circuit part 30 between the junctions Vcc and GND can again freely float within limits. The junction GND in that case cannot drop from its potential to below the potential of the second junction N2, since otherwise the fourth rectifier diode D24 would be conductive. Equally, the potential of the junction Vcc cannot drop below the potential of the second junction N2, since otherwise the second rectifier diode D22 would be conductive.

The embodiments serve merely for explanation of the invention and do not restrict this. In particular, the actual embodiments of the circuit parts 20 and 30 can be designed as desired without departing from the scope of the invention.

It has thus been shown in the foregoing how a relay control for LED tubes compatible with an electronic ballast unit can be executed.

The invention claimed is:

1. A double-end LED lamp for operation at an electronic ballast unit for a low-pressure discharge lamp, particularly a fluorescent lamp, the double-end LED lamp comprising:
   a first lamp socket with at least one first lamp terminal;
   a second lamp socket with at least one second lamp terminal;
   an LED driver unit electrically coupled between the first lamp terminal and the second lamp terminal and configured for drive control of a plurality of LEDs from a lamp voltage, which can be provided between the first lamp terminal and the second lamp terminal by the electronic ballast unit, in a first operating state, the LED driver unit comprising:
      a switching element configured for electrical isolation of the first lamp terminal from the LED driver unit in a second operating state; and
      a drive control device configured for changing at least from the second operating state to the first operating state in dependence on the lamp voltage; and
   a supply device configured to provide a supply voltage for the switching element from the lamp voltage independent of the LED driver unit, wherein the supply device comprises a coupling device which enables electrical isolation between the first lamp terminal and the second lamp terminal, wherein the coupling device comprises at least one first coupling capacitor which is coupled with the first lamp terminal, wherein the first coupling capacitor is formed by a series circuit of a first series capacitor and a second series capacitor.

2. The double-end LED lamp according to claim 1, wherein:
   the first series capacitor is of a first capacitance and a first voltage load capability; and
   the second series capacitor is of a second capacitance greater than the first capacitance and a second voltage load capability smaller than the first voltage load capability.

3. The double-end LED lamp according to claim 1, wherein the supply device further comprises a voltage regulator.

4. The double-end LED lamp according to claim 1, wherein one of the supply device and the drive control device is configured to cause the electrical isolation by the switching element when the lamp voltage drops below a predeterminable minimum value.

5. The double-end LED lamp according to claim 1, wherein one of the supply device and the drive control device is configured to cause the electrical isolation by the switching element when the lamp voltage exceeds a predeterminable maximum value.

6. The double-end LED lamp according to claim 4, wherein one of the supply device and the drive control device is configured to end electrical isolation by the switching element only when the lamp voltage has in the interim dropped below a predeterminable reset value.

7. The double-end LED lamp according to claim 1, wherein the switching element is formed by at least one electromechanical switching relay with at least one switching contact, wherein several switching contacts are connected in series.

8. A method of operating a double-end LED lamp at an electronic ballast unit for a low-pressure discharge lamp with a first lamp socket with at least one first lamp terminal, a second lamp socket with at least one second lamp terminal, and an LED driver unit which is electrically coupled between the first lamp terminal and the second lamp terminal, by drive control of a plurality of LEDs from a lamp voltage, which can be provided between the first lamp terminal and the second lamp terminal by the electronic ballast unit, in a first operating state, the method comprising:
  electrically isolating the first lamp terminal from the LED driver unit in a second operating state;
  changing at least from the second operating state to the first operating state in dependence on the lamp voltage;
  determining the lamp voltage in the first operating state;
  changing to the second operating state at least in one of the two cases of when the lamp voltage:
    in a first case drops below a predeterminable minimum value; or
    in a second case exceeds a predeterminable maximum value; and
  preventing fresh change to the first operating state until the lamp voltage has dropped below a predeterminable reset value.

9. The method according to claim 8, wherein a change from the second operating state to the first operating state takes place during an ignition process of the electronic ballast unit.

* * * * *